United States Patent
Ono et al.

(10) Patent No.: US 9,372,944 B2
(45) Date of Patent: Jun. 21, 2016

(54) NUMERICAL ANALYSIS DEVICE, ELEMENT GENERATION PROGRAM, AND NUMERICAL ANALYSIS METHOD

(75) Inventors: Hitoi Ono, Tokyo (JP); Toshiharu Nakabayashi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 701 days.

(21) Appl. No.: 13/695,087

(22) PCT Filed: Jun. 8, 2011

(86) PCT No.: PCT/JP2011/063167
§ 371 (c)(1),
(2), (4) Date: Oct. 29, 2012

(87) PCT Pub. No.: WO2011/155539
PCT Pub. Date: Dec. 15, 2011

(65) Prior Publication Data
US 2013/0046527 A1 Feb. 21, 2013

(30) Foreign Application Priority Data
Jun. 9, 2010 (JP) ................................ 2010-132114

(51) Int. Cl.
*G06F 7/60* (2006.01)
*G06F 17/10* (2006.01)
(Continued)

(52) U.S. Cl.
CPC .......... *G06F 17/5009* (2013.01); *G06F 17/509* (2013.01); *G06F 2217/16* (2013.01); *G06F 2217/34* (2013.01); *G06G 7/57* (2013.01)

(58) Field of Classification Search
CPC .............. G06F 17/5009; G06F 17/509; G06F 17/5018; G06F 2217/16; G06G 7/57
USPC ...................................................... 703/2, 9, 6
See application file for complete search history.

(56) References Cited

U.S. PATENT DOCUMENTS

2005/0216242 A1* 9/2005 Flax et al. ...................... 703/9
2010/0299122 A1* 11/2010 Golinveaux ............ G05B 17/02
703/9

FOREIGN PATENT DOCUMENTS

JP 7-103400 A 4/1995
JP 9-268544 A 10/1997
(Continued)

OTHER PUBLICATIONS

Kritpiphat, Weerapong et al. "Pipeline Network Modeling and Simulation for Intelligent Monitoring and Control: A Case Study of a Municipal Water Supply System", 1998, Ind. Eng. Chem. Res. 37, American Chemical Society.*
(Continued)

*Primary Examiner* — Kamini S Shah
*Assistant Examiner* — Cedric D Johnson
(74) *Attorney, Agent, or Firm* — Westerman, Hattori, Daniels & Adrian, LLP

(57) ABSTRACT

A numerical analysis device executes: Step 102 of selecting a fluidic device model and a pipe model used for transient analysis from among fluidic device models and pipe models that are located between a start point and an end point set in the pipeline network model constructed as a 3D model of a pipeline network that includes fluidic devices and pipes; Step 104 of dividing the selected fluidic device model and pipe model into volume elements and into junction elements; Step 106 of deriving volumes of the respective volume elements obtained and pressure loss coefficients corresponding to the respective junction elements, based on the shape of the fluidic device model, a shape of the pipe model, and a physical quantities of the fluid, of associating the volumes with the volume elements, and of associating the pressure loss coefficients with the junction elements.

7 Claims, 5 Drawing Sheets

(51) Int. Cl.
  *G06F 17/50* (2006.01)
  *G06G 7/57* (2006.01)

(56) References Cited

FOREIGN PATENT DOCUMENTS

| JP | 11-305646 A | 11/1999 |
| JP | 2001-4414 A | 1/2001 |
| JP | 2005-50027 A | 2/2005 |
| JP | 2006-209220 A | 8/2006 |

OTHER PUBLICATIONS

Reddy, H. Prashanth et al. "Simulation and State Estimation of Transient Flow in Gas Pipeline Networks Using a Transfer Function Network", 2006, Ind. Eng. Chem. Res., 45, Americal Chemical Society.*

Asli, Kaveh Hariri et al., "Some Aspects of Physical and Numerical Modeling of Water Hammer in Pipelines", Dec. 10, 2009, Springer.*

International Search Report of PCT/JP2011/063167, date of mailing Aug. 23, 2011, with Partial English translation (5 pages).

Written Opinion of the International Searching Authority of International Application No. PCT/JP2011/063167 date of mailing Aug. 23, 2011, with English translation (8 pages).

Kimura T. et al., Rocket Engine Dynamic Simulator (REDS), JAXA Research and Development Report, Oct. 25, 2004, JAXA-RR-04-010, pp. 1-22 with English abstract.

Decision to Grant a Patent dated Jun. 24, 2014, issued in Corresponding Japanese Patent Application No. 2010-132114, with Concise Explanation of Relevance (4 pages).

\* cited by examiner

NUMERICAL ANALYSIS DEVICE, ELEMENT GENERATION PROGRAM, AND NUMERICAL ANALYSIS METHOD

TECHNICAL FIELD

The present invention relates to a numerical analysis device, an element generation program, and a numerical analysis method.

BACKGROUND ART

CAD (computer aided design) tools, CAE (computer aided engineering) tools, and the like are used to perform various types of analyses for a pipeline network composed of fluidic devices and pipes used in plants etc.

In the fields of structural analysis and heat flow analysis, various types of preprocessors for automatically generating input data used for CAE from a 3D model constructed by a CAD tool have been developed. Therefore, if a model constructed by a CAD tool is obtained, it is relatively easy to realize structural analysis and heat flow analysis by a CAE tool, and it is possible to realize, in a short time, a cycle of designing with the CAD tool, evaluating design validity through analysis with the CAE tool, and redesigning with the CAD tool based on the evaluation result.

PTL 1 describes a pipe-system modeling method in which a pipe system is divided into point objects that serve as single elements corresponding to devices and branch or junction points and into interval objects that serve as composite elements collectively indicating a plurality of pipes or devices existing between the point objects; each of the objects is provided with attribute items that indicate mutual object connection relationships and attribute items that indicate the attributes of elements constituting the object; and attribute values of the interval objects are arranged in the same order as the physical arrangement of pipe elements to construct a general-purpose model common to various models with the point objects and the interval objects.

CITATION LIST

Patent Literature

{PTL 1} Japanese Unexamined Patent Application, Publication No. Hei 07-103400

SUMMARY OF INVENTION

Technical Problem

In conventional technologies, input data used to analyze temporal changes in physical quantities of a fluid in a pipeline, such as temperature, pressure, and flow velocity (hereinafter, referred to as "pipeline network transient analysis"), cannot be automatically generated from a pipeline network model constructed with a CAD tool. Thus, it is necessary to manually read input data used for pipeline network transient analysis from a pipeline network model constructed with a CAD tool. The technology of PTL 1 describes a technique for modeling the pipe system by dividing it into the point objects and the interval objects but does not mention how data of the pipe system calculated by using a CAD tool etc. is reflected in a model.

The present invention has been made in view of such circumstances, and an object thereof is to provide a numerical analysis device, an element generation program, and a numerical analysis method capable of reading out information required to perform transient analysis of a fluid in a pipeline network, from a pipeline network model constructed as a 3D model.

Solution to Problem

In order to solve the above-described problems, the present invention employs the following solutions.

According to a first aspect, the present invention provides a numerical analysis device that performs transient analysis for analyzing temporal changes in physical quantities of a fluid by using a volume junction method, based on a pipeline network model constructed as a 3D model of a pipeline network that includes fluidic devices and pipes, the numerical analysis device including: a selection unit for selecting a fluidic device model and a pipe model used for the transient analysis from among fluidic device models and pipe models that are located between a start point and an end point set in the pipeline network model, which is constructed in advance; a division unit for dividing the fluidic device model and the pipe model selected by the selection unit into a plurality of volume elements that indicate volumes of the fluidic device model and the pipe model and into a plurality of junction elements that indicate boundaries between the volume elements and that indicate increases or decreases in kinetic energy of the fluid; and a deriving unit for deriving the volumes of the respective volume elements obtained by the division unit and coefficients that indicate a magnitude of pressure loss corresponding to the respective junction elements, based on a shape of the fluidic device model, a shape of the pipe model, and the physical quantities of the fluid flowing in the pipeline network model, for associating the derived volumes with the volume elements, and for associating the derived coefficients with the junction elements.

By doing so, the selection unit selects a fluidic device model and a pipe model used for transient analysis from among fluidic device models and pipe models that are located between the start point and the end point set in the pipeline network model, which is constructed in advance as a 3D model of a pipeline network that includes fluidic devices and pipes.

Then, the division unit divides the fluidic device model and the pipe model selected by the selection unit into a plurality of volume elements that indicate the volumes of the fluidic device model and the pipe model and into a plurality of junction elements that indicate boundaries between the volume elements and that indicate increases or decreases in kinetic energy of a fluid. Furthermore, the deriving unit derives the volumes of the respective volume elements obtained by the division unit and coefficients that indicate the magnitude of pressure loss corresponding to the respective junction elements, based on the shape of the fluidic device model and the shape of the pipe model, associates the derived volumes with the volume elements, and associates the derived coefficients with the junction elements.

The above-described volume elements and junction elements are used for the transient analysis, in which temporal changes in physical quantities of a fluid are analyzed by using a volume-junction method.

In this way, in the present invention, the fluidic device model and the pipe model that constitute the pipeline network model, which is a 3D model, are divided into volume elements and into junction elements, and the volumes of the volume elements and the pressure loss coefficients of the junction elements are derived based on the shape of the fluidic device model, the shape of the pipe model, and the physical quantities of the fluid. Therefore, it is possible to read out information required to perform transient analysis of the fluid in the pipeline network, from the pipeline network model constructed as a 3D model.

In the above-described first aspect, it is preferable to further include a calculation unit for calculating a transit time of the fluid in each of the volume elements from a flow rate of the fluid and the volumes of the volume elements; and a subdivision unit for subdividing the volume elements and the junction elements such that the transit time calculated by the calculation unit falls within a predetermined difference for each of the volume elements.

By doing so, the calculation unit calculates the transit time of the fluid in each of the volume elements from the flow rate of the fluid and the volumes of the volume elements, and the subdivision unit subdivides the volume elements and the junction elements such that the transit time calculated by the calculation unit falls within a predetermined difference for each of the respective volume elements. Thus, in the present invention, it is possible to equalize the transit time of the fluid passing through each of the volume elements and to further stabilize the result of the analysis by the volume-junction method.

In the above-described first aspect, it is preferable to further include a register unit for extracting, from location information of the adjacent volume elements connected via the junction elements, only the differences in elevation therebetween and for registering the differences in elevation.

By doing so, the register unit registers the difference in elevation between the adjacent volume elements connected via the junction elements. Therefore, by using the registered difference in elevation, it is possible to reduce the number of model parameters from three-dimensional device placement information to one-dimensional information about only the difference in elevation, used for transient analysis using the volume-junction method, and to reduce the computational load.

In the above-described first aspect, it is preferable that, when the coefficients are identical, the deriving unit integrate information indicating these coefficients.

By doing so, when coefficients indicating the magnitude of pressure loss are identical, information indicating these coefficients is integrated. Therefore, the amount of information used to perform transient analysis by the volume-junction method can be reduced.

According to a second aspect, the present invention provides an element generation program for a numerical analysis device that performs transient analysis for analyzing temporal changes in physical quantities of a fluid by using a volume junction method, based on a pipeline network model constructed as a 3D model of a pipeline network that includes fluidic devices and pipes, the program causing a computer to function as: a selection unit for selecting a fluidic device model and a pipe model used for the transient analysis from among fluidic device models and pipe models that are located between a start point and an end point set in the pipeline network model, which is constructed in advance; a division unit for dividing the fluidic device model and the pipe model selected by the selection unit into a plurality of volume elements that indicate volumes of the fluidic device model and the pipe model and into a plurality of junction elements that indicate boundaries between the volume elements and that indicate increases or decreases in kinetic energy of the fluid; and a deriving unit for deriving the volumes of the respective volume elements obtained by the division unit and coefficients that indicate a magnitude of pressure loss corresponding to the respective junction elements, based on a shape of the fluidic device model, a shape of the pipe model, and the physical quantities of the fluid flowing in the pipeline network model, for associating the derived volumes with the volume elements, and for associating the derived coefficients with the junction elements.

By doing so, the fluidic device model and the pipe model that constitute the pipeline network model, which is a 3D model, are divided into volume elements and into junction elements, and the volumes of the volume elements and the pressure loss coefficients of the junction elements are derived based on the shape of the fluidic device model, the shape of the pipe model, and the physical quantities of the fluid. Therefore, it is possible to read out information required to perform transient analysis of the fluid in the pipeline network, from the pipeline network model constructed as a 3D model.

According to a third aspect, the present invention provides a numerical analysis method for performing transient analysis for analyzing temporal changes in physical quantities of a fluid by using a volume junction method, based on a pipeline network model constructed as a 3D model of a pipeline network that includes fluidic devices and pipes, the method including: a first step of selecting a fluidic device model and a pipe model used for the transient analysis from among fluidic device models and pipe models that are located between a start point and an end point set in the pipeline network model, which is constructed in advance; a second step of dividing the fluidic device model and the pipe model selected in the first step into a plurality of volume elements that indicate the volumes of the fluidic device model and the pipe model and into a plurality of junction elements that indicate boundaries between the volume elements and that indicate increases or decreases in kinetic energy of the fluid; and a third step of deriving the volumes of the respective volume elements obtained in the second step and coefficients that indicate the magnitude of pressure loss corresponding to the respective junction elements, based on a shape of the fluidic device model, a shape of the pipe model, and the physical quantities of the fluid flowing in the pipeline network model, of associating the derived volumes with the volume elements, and of associating the derived coefficients with the junction elements.

According to the present invention, an advantage is afforded in that it is possible to read out information required to perform transient analysis of a fluid in a pipeline network, from a pipeline network model constructed as a 3D model.

DESCRIPTION OF EMBODIMENTS

A numerical analysis device, an element generation program, and a numerical analysis method according to one embodiment of the present invention will be described below with reference to the drawings.

First Embodiment

Figure 1:
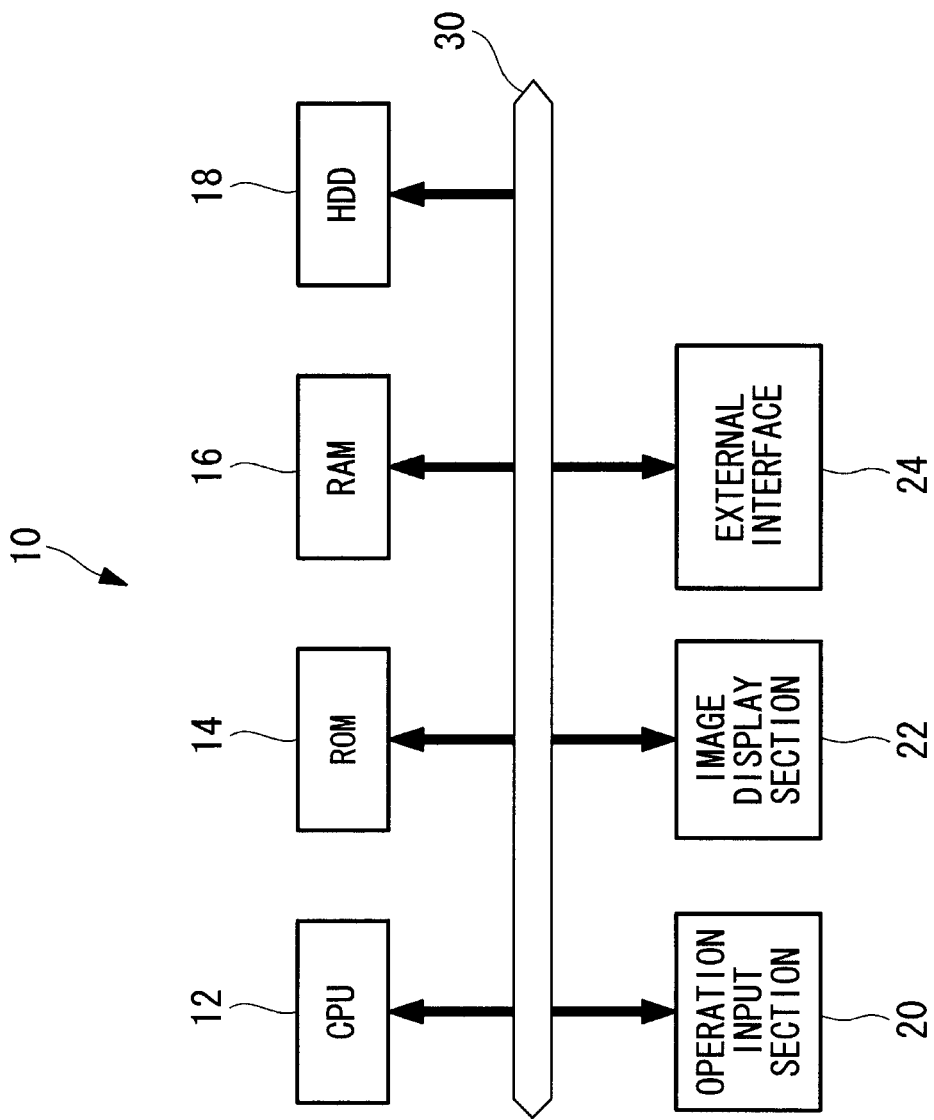
FIG. 1 is a block diagram showing the electrical configuration of a numerical analysis device according to a first embodiment of the present invention.

A first embodiment of the present invention will be described below. FIG. 1 shows the electrical configuration of a numerical analysis device 10 according to the first embodiment.

The numerical analysis device 10 includes a CPU (central processing unit) 12 that controls the operation of the entire numerical analysis device 10; a ROM (read only memory) 14 that stores various programs and various parameters in advance; a RAM (random access memory) 16 that is used as a work area when the various programs are executed by the CPU 12; and an HDD (hard disk drive) 18 that serves as a storage unit for storing various types of information and various programs, such as a CAE numerical analysis program and an element generation program, to be described later in detail.

Furthermore, the numerical analysis device 10 includes an operation input section 20 that is formed of a keyboard and a mouse and that receives various operation inputs; an image display section 22, such as an LCD (liquid crystal display), that displays a pipeline network model constructed by a CAD tool or various types of information, such as the result of numerical analysis; and an external interface 24 that is connected to external units, such as another information processing unit and a printer, and through which various types of information is sent to and received from the external units.

The CPU 12, the ROM 14, the RAM 16, the HDD 18, the operation input section 20, the image display section 22, and the external interface 24 are electrically connected to each other via a system bus 30. Therefore, the CPU 12 can access the ROM 14, the RAM 16, and the HDD 18, can obtain operation inputs at the operation input section 20, can display various images on the image display section 22, and can send and receive various types of information to and from the above-described external units via the external interface 24.

The HDD 18 stores, in advance, pipeline network model data indicating a pipeline network model that is constructed as a 3D model by a CAD tool from a pipeline network composed of fluidic devices and pipes. Furthermore, the CAD tool may be installed in the numerical analysis device 10 so that the pipeline network model is constructed by the numerical analysis device 10. Alternatively, for example, the pipeline network model may be constructed by using another information processing unit connected via the external interface 24, and the pipeline network model may be stored in the HDD 18.

Figure 2:
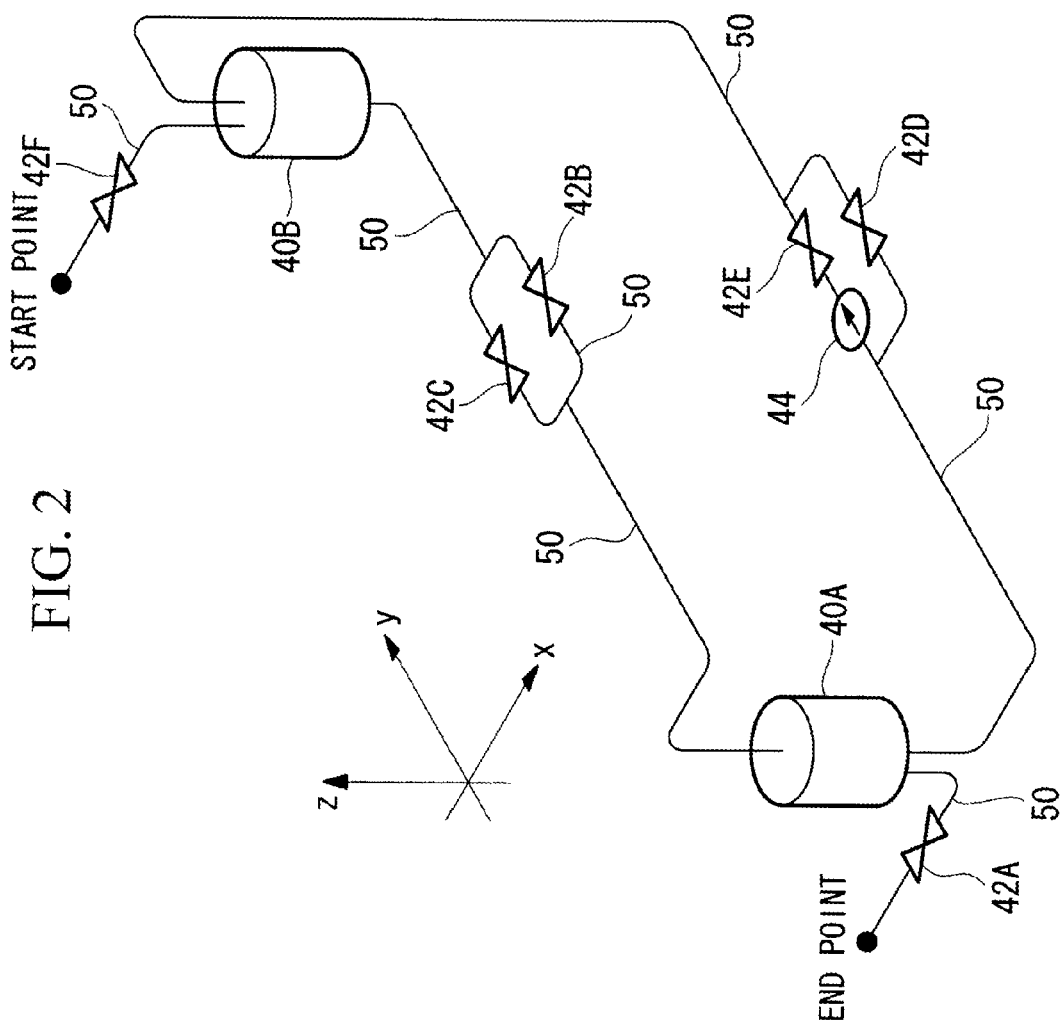
FIG. 2 is a schematic view showing an example pipeline network model constructed as a 3D model according to the first embodiment of the present invention.

FIG. 2 shows an example pipeline network model (pipe isometric view) generated by the CAD tool.

The pipeline network model shown in the figure includes tanks 40A and 40B, valves 42A to 42F, and a pump 44, serving as fluidic devices, and the fluidic devices are coupled via pipes 50. Furthermore, when the pipes 50 have different diameters, they are coupled via flanges.

Device numbers are assigned to fluidic device models and pipe models included in the pipeline network model, and the types of the fluidic device models and the pipe models (for example, the types of pipes (straight pipe, coupling, reducer, bend, branch, and junction)) are identified by the device numbers. Furthermore, the shapes of the fluidic device models and the pipe models (for example, data about the shape of a pipe includes: equivalent roughness, straight-pipe inner diameter, length, inlet inner diameter, outlet inner diameter, expansion angle, bend inner diameter, radius of curvature, and bending angle) are input.

Furthermore, in the pipeline network model, probes indicating places where the physical quantities of a fluid (temperature, pressure, flow velocity, and flow rate) are detected in transient analysis using a CAE tool are set in advance.

On the other hand, in the transient analysis using the CAE tool, the physical quantities of a fluid flowing in the pipeline network are analyzed through numerical simulation by using basic equations composed of three types of conservation equations (equations of continuity): mass conservation equation, momentum conservation equation, and energy conservation equation. Therefore, it is necessary to convert the basic equations to computer-calculatable equations. Specifically, the physical quantities, such as temperature, pressure, flow velocity, and flow rate, which continuously change in the direction of a fluid flow, need to be spatially divided and discretized.

Thus, the above-described basic equations are spatially discretized by a volume-junction method in which flow paths constituting the pipeline network are divided into volume elements, and the boundaries between the volume elements are connected with junction elements.

The volume elements indicate the volumes of the flow paths through which the fluid flows. Specifically, the volume elements are pipes, tanks, a heat exchanger, and a header pipe. Furthermore, the junction elements indicate increases or decreases (something that gives pressure to the fluid or drag that reduces the pressure of the fluid) in the kinetic energy of the fluid. Specifically, the junction elements are the pump and parts where flow path areas are suddenly expanded or suddenly narrowed, such as valves, orifices, and flanges.

Figure 3:
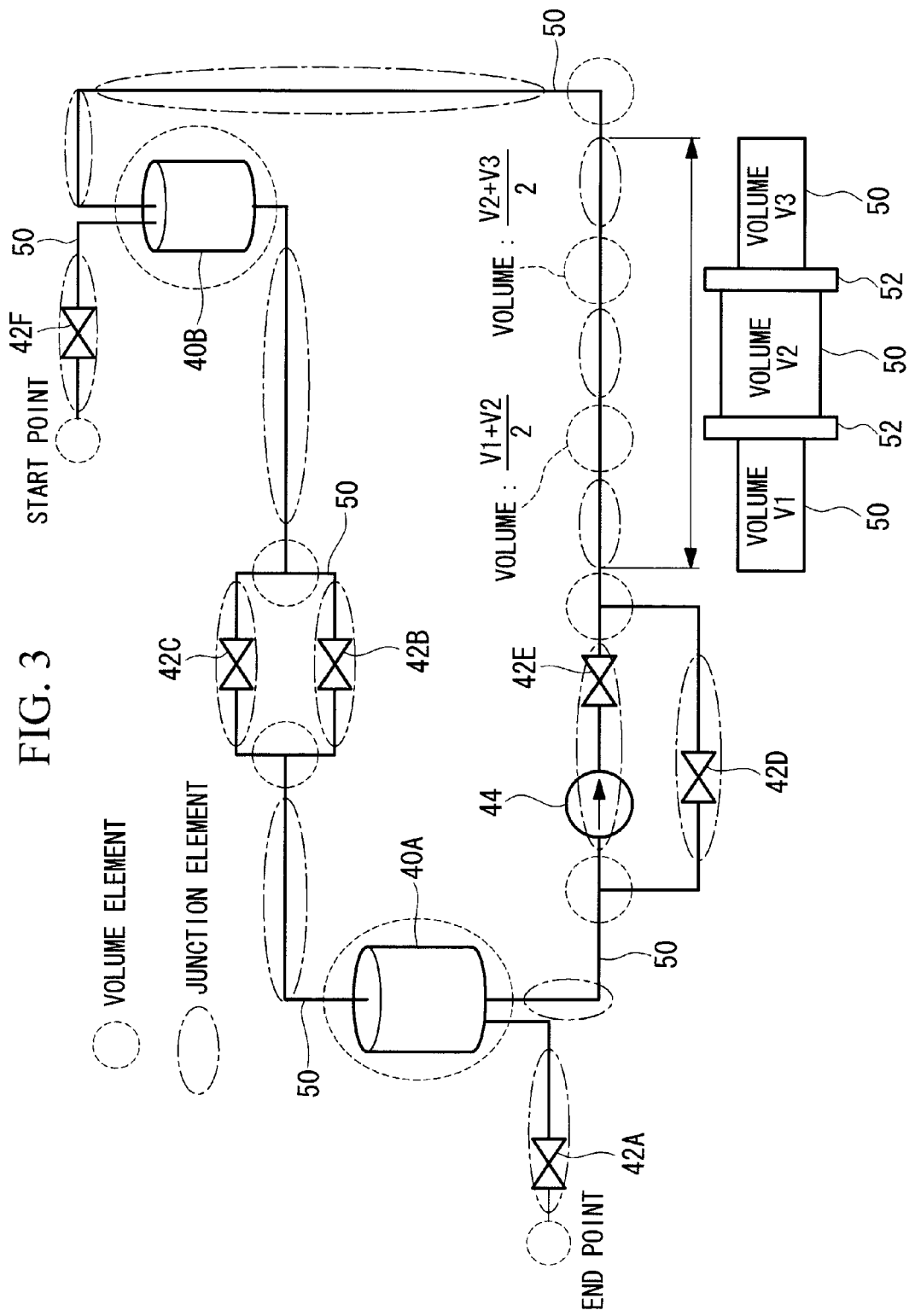
FIG. 3 is a schematic view showing an example pipeline network used for transient analysis according to the first embodiment of the present invention.

FIG. 3 is a pipeline network diagram schematically showing the volume elements and the junction elements generated based on the pipeline network model shown in FIG. 2.

In the pipeline network diagram shown in FIG. 3, the pipes 50 and the tanks 40A and 40B serve as volume elements. On the other hand, the valves 42A to 42F, the pump 44, and flanges 52 serve as junction elements. As shown in the figure, the junction elements are disposed at the boundaries between the volume elements. Each volume element indicates a volume corresponding to the average of the volumes of adjacent pipes 50 connected via a flange 52.

In order to conduct transient analysis by the volume-junction method, the numerical analysis device 10 of the first embodiment performs element generation processing of generating volume elements and junction elements corresponding to the pipeline network model based on the pipeline network model. Specifically, the numerical analysis device 10 of the first embodiment also acts as an element generating device that generates the above-described volume elements and junction elements.

Next, the operational effect of the numerical analysis device 10 of the first embodiment will be described.

Figure 4:
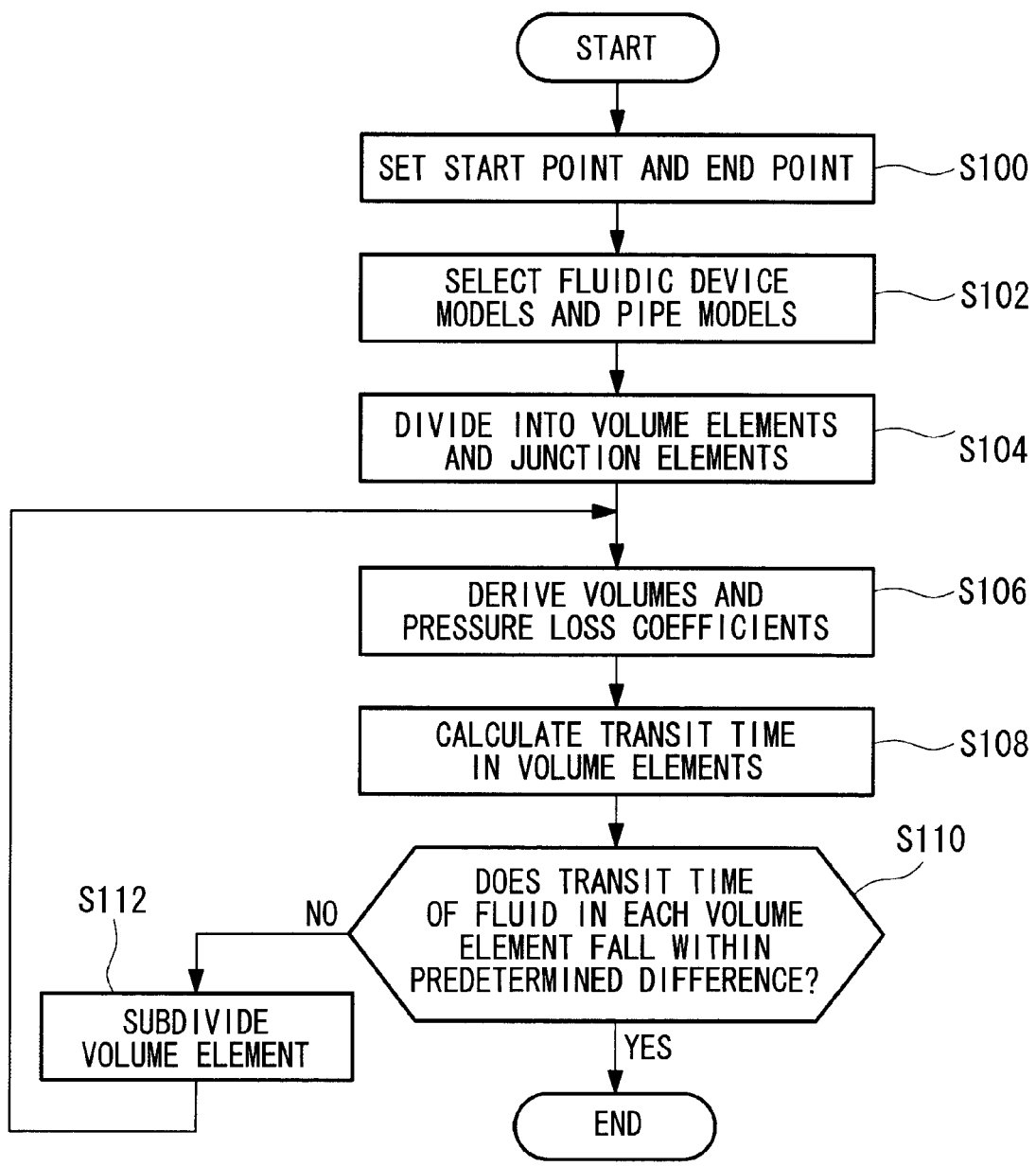
FIG. 4 is a flowchart showing the processing flow of an element generation program according to the first embodiment of the present invention.

FIG. 4 is a flowchart showing the processing flow of the element generation program executed by the CPU 12 when the element generation processing is performed. The element generation program is stored in advance in a predetermined area of the HDD 18.

First, in Step 100, the pipeline network model stored in the HDD 18 is read, and the start point and the end point of a portion to be subjected to transient analysis are set in the pipeline network model. The start point and the end point are set by the user via the operation input section 20.

In the next step 102, fluidic device models and pipe models to be used for the transient analysis are selected from among the fluidic device models and the pipe models that are disposed between the start point and the end point set in Step 100.

Specifically, in the first embodiment, since the individual models are identified by the device numbers assigned to the fluidic device models in the pipeline network model, fluidic device models and pipe models to be used for the transient analysis are selected based on the device numbers. Furthermore, among the pipe models that couple the fluidic device models, pipe models on which the above-described probes are provided and pipe models having diameters equal to or larger than a diameter set in advance by the user are selected as those used for the transient analysis. Furthermore, other than the pipe models that couple the fluidic device models, models that indicate vent pipes and drain pipes, serving as pipes through which the fluid flows out of the pipeline network model, may be selected by the user as those used for the transient analysis.

In the next step 104, the fluidic device models and the pipe models selected in Step 102 are divided into volume elements and junction elements.

As described above, in the first embodiment, the pipes, the tanks, the heat exchanger, and a pipe-branching part, such as a header pipe, are divided into volume elements; the fluidic devices (valves, orifices, and flanges) where flow path areas are expanded or narrowed and the pump are divided into junction elements. Furthermore, the models on which the probes that detect temperature, pressure, and concentration are provided are divided into volume elements, and the models on which the probes that detect the physical quantities indicating the magnitude of a fluid flow, such as the flow velocity and the flow rate, are provided are divided into junction elements. As described above, the junction elements are disposed between the volume elements.

In the next step 106, the diameters and the lengths of pipes through which the fluid flows are extracted from the pipe models and the fluidic device models that have been divided into volume elements of the pipeline network model, thereby deriving the volumes of the respective volume elements. Furthermore, coefficients indicating the magnitude of pressure loss (hereinafter, referred to as "pressure loss coefficients") are derived based on the shapes of the fluidic device models, the shapes of the pipe models, and the physical quantities of the fluid flowing through the pipeline network model. The derived volumes are associated with the respective volume elements, and the derived pressure loss coefficients are associated with the respective junction elements.

The above-described diameters and lengths of pipes indicate the diameters and lengths of the pipe models and the diameters and lengths of pipes in the fluidic device models. Furthermore, the physical quantities of the fluid are, for example, constituents (concentrations), a reference pressure, a reference temperature, and a reference flow rate of the fluid that is input at the start point.

In the first embodiment, connected pipes having the same diameter are divided so as to have volumes equal to or lower than a volume specified in advance. The volumes obtained after the division are associated with the volume elements.

Furthermore, to derive the pressure loss coefficients, another program for deriving the pressure loss coefficients may be used. In that case, information indicating the shapes of the fluidic device models and the shapes of the pipe models is input to the program. Then, the pressure loss coefficients derived by the program are read and associated with the respective junction elements.

When the derived pressure loss coefficients are identical, information indicating the pressure loss coefficients is integrated. Specifically, for example, information indicating the identical pressure loss coefficient is stored in a predetermined memory area, and address information that indicates the address of the predetermined memory area is associated with the junction elements. Then, when transient analysis is performed, the stored pressure loss coefficient is read based on the above-described address information. Thus, the amount of information used to perform transient analysis by the volume-junction method can be reduced.

In the next step 108, the transit time of the fluid in each of the volume elements is calculated from the flow rate of the fluid and the volume of the volume element. The flow rate of the fluid is, for example, the volume flow rate obtained when the pipeline network model is set in rated operation.

In the next step 110, it is determined whether the transit time calculated in Step 108 falls within a predetermined difference for the respective volume elements. If an affirmative determination is made, this program ends. On the other hand, if a negative determination is made, the processing flow advances to Step 112. Specifically, in the processing in Step 110, a volume element whose transit time, calculated in Step 108, is the shortest is identified, and, if there is a volume element whose transit time is a predetermined number of times larger than (twice as large as, as an example) the shortest transit time, it is determined that the transit time of the volume element exceeds the above-described predetermined difference, thus making a negative determination in Step 110.

In Step 112, a volume element whose transit time exceeds the above-described predetermined difference is subdivided by a predetermined number, and the processing flow returns to Step 106. Thus, it is possible to equalize the transit time of the fluid passing through each of the volume elements and to further stabilize the result of the analysis by the volume-junction method. A new junction element is disposed between volume elements obtained through the subdivision.

Then, after this program ends, based on the pipeline network in which the volume elements and the junction elements are disposed by this program, the numerical analysis device 10 of the first embodiment performs transient analysis with the numerical analysis program by using the volume-junction method.

As described above, in the numerical analysis device 10 of the first embodiment, the fluidic device models and the pipe models that constitute the pipeline network model, which is a 3D model, are divided into volume elements and junction elements, and the volumes of the volume elements and the pressure loss coefficients of the junction elements are derived based on the shapes of the fluidic device models, the shapes of the pipe models, and the physical quantities of the fluid. Therefore, it is possible to read out information required to perform transient analysis of the fluid in the pipeline network, from the pipeline network model constructed as a 3D model.

Second Embodiment

A second embodiment of the present invention will be described below.

Since the electrical configuration of the numerical analysis device 10 according to the second embodiment is the same as that shown in FIG. 1, a description thereof will be omitted.

Next, the operational effect of the numerical analysis device 10 of the second embodiment will be described.

Although the processing flow of an element generation program according to the second embodiment is the same as the processing shown in FIG. 4, the difference in elevation (hereinafter, referred to as "elevation difference") between adjacent volume elements connected via a junction element is calculated from information indicating the locations of the volume elements, in Step 106 in FIG. 4.

Figure 5:
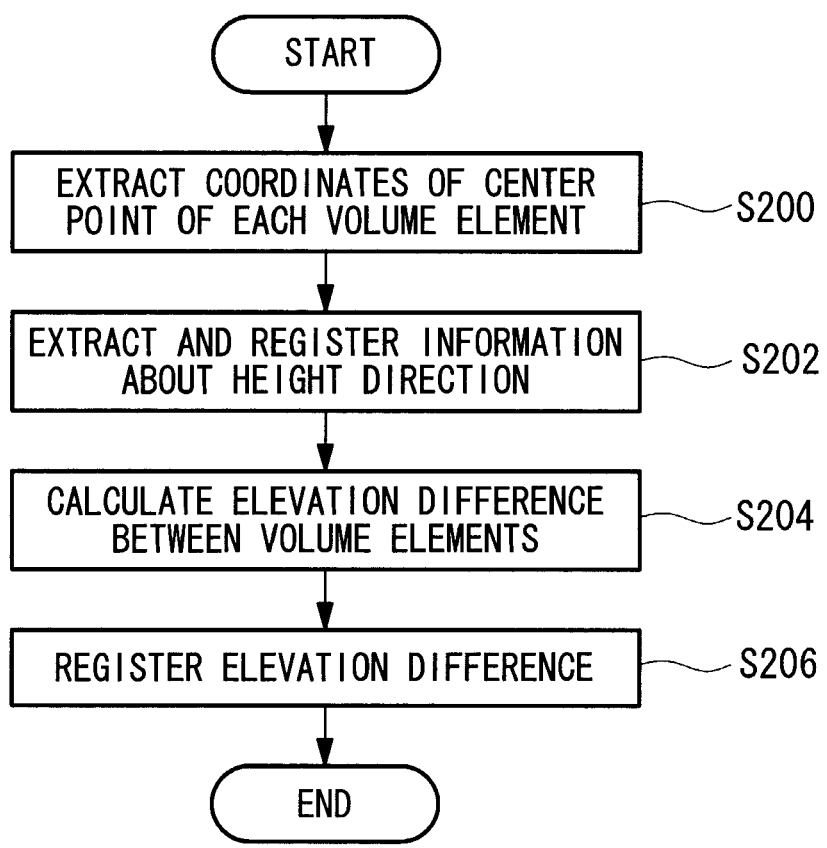
FIG. 5 is a flowchart showing the processing flow for registering the elevation difference, according to a second embodiment of the present invention.

FIG. 5 shows the processing flow for deriving the elevation difference, performed in Step 106 in FIG. 4.

First, in Step 200, the coordinates (x, y, z) of the center point of each of the volume elements is extracted from the pipeline network model.

In the next step 202, among the coordinates (x, y, z) of the center point extracted in Step 200, the value of information in the height direction (z) is extracted.

In the next step 204, the elevation difference between the adjacent volume elements connected via the junction element is calculated from the information in the height direction (z) of those volume elements, extracted in Step 202.

In the next step 206, the elevation difference calculated in Step 204 is registered for the volume elements or the junction element.

As described above, in the numerical analysis device 10 of the second embodiment, as location information of adjacent volume elements connected via a junction element, only the elevation difference therebetween is registered. Therefore, by using the registered elevation difference, it is possible to reduce the number of parameters used for transient analysis using the volume-junction method and to reduce the computational load.

The present invention has been described above by using the above-described embodiments. However, the technical scope of the present invention is not limited to the scope of the above-described embodiments. Various modifications and improvements can be added to the above-described embodiments without departing from the scope of the invention, and an embodiment in which such modifications and improvements are added is also encompassed in the technical scope of the present invention.

For example, in the above-described embodiments, the element generation program is stored in the HDD 18; however, the present invention is not limited thereto, and a configuration may be used in which the element generation program is stored in a portable storage medium, which includes a memory IC (integrated circuit) card; a memory card; and an optical disk, such as a magnetic disc, a CD (compact disc), and a DVD (digital versatile disc), and the numerical analysis device 10 reads and executes the element generation program stored in the portable storage medium.

REFERENCE SIGNS LIST

10 numerical analysis device
12 CPU
18 HDD
20 operation input section

The invention claimed is:

1. A numerical analysis device that performs transient analysis for analyzing temporal changes in physical quantities of a fluid by using a volume-junction method, based on a pipeline network model constructed as a 3D model of a pipeline network that includes fluidic devices and pipes, the numerical analysis device comprising:
   a memory that stores program instructions; and
   a processor that receives the program instructions stored in the memory and executes the program instructions, causing the processor to be configured as:
      a selection unit for selecting a fluidic device model and a pipe model used for the transient analysis from among fluidic device models and pipe models that are located between a start point and an end point set in the pipeline network model, which is constructed in advance;
      a division unit for dividing the fluidic device model and the pipe model selected by the selection unit into a plurality of volume elements that indicate volumes of the fluidic device model and the pipe model and into a plurality of junction elements that indicate boundaries between the volume elements and that indicate increases or decreases in kinetic energy of the fluid;
      a deriving unit for deriving the volumes of the respective volume elements obtained by the division unit and coefficients that indicate a magnitude of pressure loss corresponding to the respective junction elements, based on a shape of the fluidic device model, a shape of the pipe model, and the physical quantities of the fluid flowing in the pipeline network model, for associating the derived volumes with the volume elements, and for associating the derived coefficients with the junction elements;
      a calculation unit for calculating a transit time of the fluid in each of the volume elements from a flow rate of the fluid, which is a volume flow rate obtained when the pipeline network model is set in rated operation, and the volume of each of the volume elements; and
      a subdivision unit for subdividing the volume elements such that a difference in the transit time of the fluid among the volume elements falls within a predetermined value.

2. The numerical analysis device according to claim 1, wherein the processor that receives the program instructions stored in the memory and executes the program instructions, causes the processor to be further configured as:
   a register unit for extracting, from location information of adjacent volume elements connected via the junction elements, only differences in elevation therebetween and for registering the differences in elevation.

3. The numerical analysis device according to claim 2, wherein, when the coefficients are identical, the deriving unit integrates information indicating these coefficients.

4. The numerical analysis device according to claim 1, wherein, when the coefficients are identical, the deriving unit integrates information indicating these coefficients.

5. The numerical analysis device according to claim 1, wherein the processor that receives the program instructions stored in the memory and executes the program instructions, causes the processor to be further configured as:
   an identifying unit for identifying the volume element whose transit time is the shortest, wherein,
   the subdivision unit subdivides the volume element whose transit time is a predetermined number of times larger than the shortest transit time.

6. A non-transitory computer-readable storage medium having recorded thereon an element generation program for a numerical analysis device that performs transient analysis for analyzing temporal changes in physical quantities of a fluid by using a volume-junction method, based on a pipeline network model constructed as a 3D model of a pipeline network that includes fluidic devices and pipes, the program causing a computer to perform the steps of:
   selecting a fluidic device model and a pipe model used for the transient analysis from among fluidic device models and pipe models that are located between a start point and an end point set in the pipeline network model, which is constructed in advance;

dividing the fluidic device model and the pipe model selected by the selection unit into a plurality of volume elements that indicate volumes of the fluidic device model and the pipe model and into a plurality of junction elements that indicate boundaries between the volume elements and that indicate increases or decreases in kinetic energy of the fluid; and deriving the volumes of the respective volume elements obtained by the division unit and coefficients that indicate a magnitude of pressure loss corresponding to the respective junction elements, based on a shape of the fluidic device model, a shape of the pipe model, and the physical quantities of the fluid flowing in the pipeline network model, for associating the derived volumes with the volume elements, and for associating the derived coefficients with the junction elements;

calculating a transit time of the fluid in each of the volume elements from a flow rate of the fluid, which is a volume flow rate obtained when the pipeline network model is set in rated operation, and the volume of each of the volume elements; and subdividing the volume elements such that a difference in the transit time of the fluid among the volume elements falls within a predetermined value.

7. A numerical analysis method for performing transient analysis for analyzing temporal changes in physical quantities of a fluid by using a volume-junction method, based on a pipeline network model constructed as a 3D model of a pipeline network that includes fluidic devices and pipes, the method comprising:

a first step of selecting a fluidic device model and a pipe model used for the transient analysis from among fluidic device models and pipe models that are located between a start point and an end point set in the pipeline network model, which is constructed in advance;

a second step of dividing the fluidic device model and the pipe model selected in the first step into a plurality of volume elements that indicate volumes of the fluidic device model and the pipe model and into a plurality of junction elements that indicate boundaries between the volume elements and that indicate increases or decreases in kinetic energy of the fluid; and a third step of deriving the volumes of the respective volume elements obtained in the second step and coefficients that indicate the magnitude of pressure loss corresponding to the respective junction elements, based on a shape of the fluidic device model, a shape of the pipe model, and the physical quantities of the fluid flowing in the pipeline network model, of associating the derived volumes with the volume elements, and of associating the derived coefficients with the junction elements;

a fourth step of calculating a transit time of the fluid in each of the volume elements from a flow rate of the fluid, which is a volume flow rate obtained when the pipeline network model is set in rated operation, and the volume of each of the volume elements; and a fifth step of subdividing the volume elements such that a difference in the transit time of the fluid among the volume elements falls within a predetermined value.

* * * * *